Oct. 21, 1930.                    L. S. BRACH                    1,778,883
                    TESTING DEVICE FOR ELECTRICAL CIRCUITS
                             Filed May 31, 1930
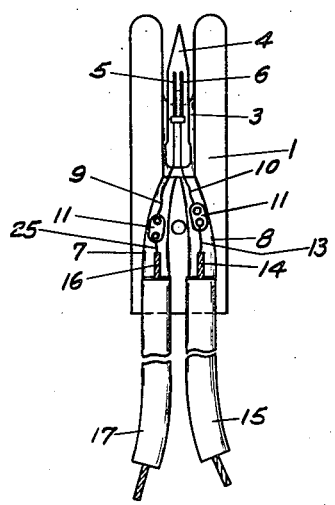
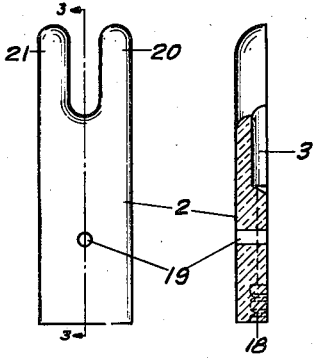
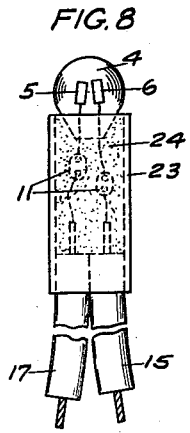
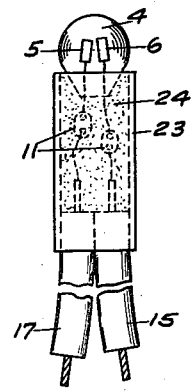
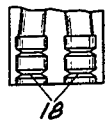
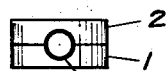
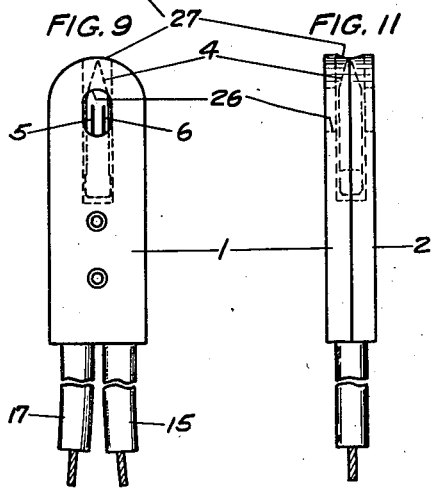
Inventor
LEON S. BRACH
Attorney A. D. T. Libby

Patented Oct. 21, 1930

1,778,883

UNITED STATES PATENT OFFICE

LEON S. BRACH, OF EAST ORANGE, NEW JERSEY, ASSIGNOR TO L. S. BRACH MANUFACTURING CORPORATION, OF NEWARK, NEW JERSEY

TESTING DEVICE FOR ELECTRICAL CIRCUITS

Application filed May 31, 1930. Serial No. 458,075.

This invention relates to a device which is adapted for use in determining whether or not the conductors of an electrical circuit are "alive". The present application is a continuation in greater part of my application Serial No. 367,737, filed June 1, 1929.

It is the object of my invention to provide a testing device which may without any change whatever, be used in testing circuits that may have various potentials existing between opposite conductors of the circuit; for example, the same instrument may be used for testing lighting and power circuits from 110 to 550 volts, A. C. or D. C.

Another and important object of my invention is to provide a testing device which is very small and compact and which may be carried in a vest-pocket, just the same as a fountain pen or pencil. I have found that object can only be attained by the utilization of a special form of resistance which will be later referred to, and in which a very high resistance can be incorporated in a very small space.

It is obvious that a standard 110-volt lamp which might be used for testing a 110-volt circuit, cannot be bridged across the wires of a 220, 440, or 550-volt circuit, without destruction of the lamp. Furthermore, a 110-volt lamp whether of the regular or candelabra type, when mounted in a socket, is more or less clumsy and is very inconvenient to put in one's pocket. If such an arrangement is used for testing 110-volt circuits, the lamp would require to be changed in testing a 220, 440, or 550-volt circuit, and in either case, the testers may not know in advance what the potential is on the wires that are to be tested and they would have to start with their highest voltage lamp and change to a lower voltage lamp if they got no results, and so on down the scale.

It is therefore a further object of my invention to provide a testing device which will indicate that the wires are "alive", even though the potential on the wires is, for example, any one of the different voltages mentioned. Of course, any other voltage below the maximum and above the minimum for which the instrument is designed, may be tested with impunity with my new testing device.

Another object of my invention is to provide a testing device of the class described, which while being small and neat, is cheap to manufacture, and one that will not readily get out of order.

These and other objects will be apparent to one skilled in this art after a study of the annexed drawing, wherein:

Figure 1 is a plan view of the testing device with one portion removed, showing the interior construction of a preferred form of the device.

Figure 2 is a plan view of the part removed from Figure 1.

Figure 3 is a section on the line 3—3 of Figure 2.

Figure 4 is a plan view of the end of the container which receives the electrical conductor.

Figure 5 is a plan view of a resistor unit used in connection with the testing device.

Figure 6 is a side view of Figure 5.

Figure 7 is a plan view showing one form of terminal which may be used with the outer ends of the conductors forming part of the testing device.

Figure 8 shows a modified form of the testing device.

Figure 9 is a plan view of a preferred form of testing device.

Figure 10 is an end view of Figure 9.

Figure 11 is a side view of Figure 9.

In the drawing, 1 and 2 illustrate preferably identical pieces of good insulating material which make up the container or casing carrying the other parts of the testing device. Preferably, each part of the casing is provided with a groove 3 adapted to receive a lamp 4. The lamp 4 is preferably of the glow type and filled with neon gas, and is provided with electrodes 5 and 6 which give the necessary excitation to the lamp. Additional grooves 7 and 8 are preferably provided in each of the pieces 1 and 2 to receive the terminal wires 9 and 10 extending from the lamp 4.

Connected in series with at least one of the terminal wires, for example 10, is a resistor 11 which preferably is constructed in a manner similar to "grid leaks" used in radio circuits. Connections are made to the resistor 11 by means of eyelets 12. A wire 13 extends from the resistor 11 to the electrical conductor 14 comprisng part of the cable 15.

I have found from practical experience that when the testing device is used on the higher voltage circuits previously mentioned, such voltage may sometimes force too much current through the grid leak resistor, which for the conditions specified, has an approximate value of about 100,000 ohms. This greater amount of current, due to the higher voltage, causes the grid leak resistor to heat up and after the heat becomes high enough, the resistor "flashes over" or short-circuits, and the establishment of this short circuit greatly decreases the resistance of the neon lamp, with the result that the lamp is likely to explode inside the casing.

To avoid this unsatisfactory and perhaps dangerous condition, I have discovered that the difficulty is entirely overcome by dividing the resistor into a plurality of parts; for example, if two resistors are used each of approximately 50,000 ohms, the upper limit of the voltage to be tested can be raised materially over that which can be safely tested where only one resistor is used. In practice I have found that where two resistors are used, one will give out before the other and when giving out this will first short-circuit and then open before any damage is done to the second resistor. In other words, the resistors of the grid leak type which are the type used in this testing device for the reasons heretofore set forth, cannot be made in practice close enough to each other so that they will both open together.

I have also found that it makes substantially no difference whether or not the resistors are connected one on each side of the lamp as shown in Figure 1, or whether they are connected in series on the same side of the lamp, the essential thing being that the grid resistance be divided into at least two parts so that the difference in the manufacture of these parts allows the devices to function as described. By having the grid resistance divided as explained, each of them will stand a much higher degree of heat without burning out.

Preferably, the cables 15 and 17 extend within the interior of the casing and are engaged by serrations 18 formed integral with the grooves that are adapted to receive the ends of the cables 15 and 17.

The two parts 1 and 2 are held together in any satisfactory manner as by an eyelet passing through a hole 19 in each of the members 1 and 2. In the form shown in Figure 9, two eyelets are used.

In order to protect the lamp 4, I may use the method shown in Figure 1, or that shown in Figures 9 to 11 inclusive. In Figure 1, each of the parts 1 and 2 have projections 20 and 21 which extend outwardly beyond the body portion of the casing, so as to protect the end of the lamp 4 both in an endwise as well as a sidewise direction, thereby leaving the lamp 4 in position so as to emit a glow therefrom when the outer ends of the conductors 14 and 16 are connected across the wires of an electrical circuit.

The outer ends of the conductors 14 and 16 may be provided with pointed terminals 22 for ease in making connection with electrical conductors or with exposed metal parts within a cut-out, junction box, switch or the like. The pointed ends of the terminals 22 may if desired, be provided with a guard to prevent them from injuring the pocket of the one carrying the device.

As will be observed from what has been said, the casing is oblong in shape and is somewhat wider than the width of the two conductors 15 and 17. After soldering the wires 25 and 13 to the conductors 14 and 16, and making connection to the resistors 11, these parts are then placed within the half groove provided in one of the casing members 1 or 2, and the other part then placed over it, and the attaching means then applied, thereby holding all of the aforesaid parts securely in position.

In the form of device shown in Figure 8, the lamp 4 may be of somewhat different form than that shown in Figure 1, and the casing 23 is a hollow insulating tube, within which the parts are positioned as shown in Figure 8, and then suitable wax is poured in while hot, thereby filling the space 24 within the casing and acting to hold the wires, resistors, lamp and cables securely in position. In this latter construction, however, the lamp cannot be removed without substantially destroying the device, as there is no socket for the lamp as this is held in position by the sealing wax.

In the preferred form shown in Figures 9 to 11 inclusive, the two parts of the casing 1 and 2 are provided with side sight openings 26 and an end opening 27, threby protecting the lamp in a better manner than the form of casing shown in Figures 1 to 3 inclusive.

From what has been said, it will be seen that the resistor which I use in my testing device does not require taps and/or switches for cutting in or out of circuits more or less of such resistance which has heretofore been necessary in test instruments used for the purposes herein described. Such prior art multi-stage devices clearly cannot be made in the small compact style as the device of this specification, which is a single-stage device having fixed charteristics; i. e., the device can be connected without change to circuits of different voltages and while I have mentioned 550 volts which is the highest of the ordinary voltages encountered in factories, etc., the device will stand without injury even higher voltages.

It is obvious that certain of the details entering into the construction of my device may be altered without departing from the spirit of my invention or the scope of the appended claims.

Having thus described my invention, what I claim is:

1. A testing device for electrical circuits consisting of; a casing having at least two parts of insulation material, some of said parts having recesses therein, a lamp carried by the casing, a pair of spaced resistors of the grid leak type and conductor terminals positioned within said recesses and connected in series with each other and the lamp, one end of the lamp being visible from the casing, and means for fastening said insulation parts together.

2. A testing device for electrical circuits consisting of; a plural-part casing of insulation material, at least two of said parts having recesses therein and oppositely disposed lamp-protecting portions, a lamp carried by the casing, a resistor of the grid leak type arranged in two sections and the sections connected in series with each other and the lamp, conductor terminals positioned within said recesses and connected in series with the lamp and resistor, one end of the lamp being exposed by the casing between said protecting portions, means for fastening said insulating parts together, and means for clamping said conductors so exterior strains thereon will be taken up by the casing.

3. A testing device for electrical circuits consisting of; a plural-part casing of insulating material, at least one of said parts having a groove therein, a lamp fitting in said groove and having at least one end visible, at least one of said parts having other grooves therein, a pair of resistors of the grid leak type positioned preferably one in each of the last-mentioned grooves and arranged in series with each other and the lamp, and conductor terminals positioned in certain other of said grooves and connected through said resistors to said lamp; means on said parts for gripping the conductors, and means for holding said two parts together.

4. A testing device for electrical circuits consisting of; a casing, a neon gas filled lamp carried by the casing so as to be exposed at one end thereof, a pair of resistors of the grid leak type carried within the casing and connected in series with each other and with said lamp, electrical conductors entering said casing for applying potential to said lamp, and means for holding the lamp, resistors and conductors in place with respect to the casing.

5. A testing device for electrical circuits consisting of; a casing of insulating material, said casing having at least two parts with recesses therein, a neon gas filled lamp positioned in one recess and having its end exposed to emit light, said casing having parts for guarding the exposed lamp end, a plurality of resistors of the grid leak type positioned in spaced relation in said recesses and connected in series with each other and with the lamp, testing conductors having ends extending within the casing and connected to the lamp and resistors respectively, and means for fastening the parts of the casing together for the purposes described.

6. A testing device for electrical circuits consisting of; a casing, a neon glow lamp carried by the casing, a pair of terminal conductors for connecting the lamp across an electrical circuit, said conductors having their ends enclosed and held within said casing, a plurality of resistors of the grid leak type held within the casing and connected in series with each other and the lamp and said terminal conductors.

7. A testing device for electrical circuits consisting of; a casing of insulating material, said casing being divided into a plurality of parts at least two of which have co-ordinating recesses therein, a pair of insulated conductor cables extending within the casing at one end into a pair of said recesses, a gas filled glow lamp positioned in one of said recesses and being visible from the other end of the casing, guard means for the lamp comprising parts of the casing, resistors and connectors positioned within certain of said recesses, said connectors electrically joining the lamp and the resistors which are all in series to the conductors of said cables, and means for clamping the two parts of the casing together.

In testimony whereof, I affix my signature.

LEON S. BRACH.